(12) United States Patent
Okajima et al.

(10) Patent No.: US 9,024,830 B2
(45) Date of Patent: May 5, 2015

(54) EYEGLASSES-TYPE WIRELESS COMMUNICATIONS APPARATUS

(75) Inventors: Yusuke Okajima, Osaka (JP);
Tomofumi Katayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 289 days.

(21) Appl. No.: 13/876,385

(22) PCT Filed: Dec. 20, 2011

(86) PCT No.: PCT/JP2011/079437
§ 371 (c)(1),
(2), (4) Date: Mar. 27, 2013

(87) PCT Pub. No.: WO2012/086619
PCT Pub. Date: Jun. 28, 2012

(65) Prior Publication Data
US 2013/0194141 A1    Aug. 1, 2013

(30) Foreign Application Priority Data

Dec. 22, 2010  (JP) .................................. 2010-286381

(51) Int. Cl.
| | | |
|---|---|---|
| *H01Q 1/12* | (2006.01) | |
| *H01Q 1/27* | (2006.01) | |
| *G02C 11/00* | (2006.01) | |
| *H01Q 9/26* | (2006.01) | |
| *H01Q 9/42* | (2006.01) | |

(52) U.S. Cl.
CPC ................ *H01Q 1/273* (2013.01); *G02C 11/10* (2013.01); *H01Q 9/26* (2013.01); *H01Q 9/42* (2013.01); *H04B 1/385* (2013.01)

(58) Field of Classification Search
USPC .................... 343/718, 793; 351/158
See application file for complete search history.

(56) References Cited

U.S. PATENT DOCUMENTS

| | | | |
|---|---|---|---|
| 5,020,150 A * | 5/1991 | Shannon .................... 455/343.1 |
| 2008/0055537 A1* | 3/2008 | Asrani et al. .................... 351/41 |
| 2012/0169990 A1* | 7/2012 | Burnstein .................... 351/115 |
| 2012/0215291 A1* | 8/2012 | Pugh et al. .................... 607/93 |
| 2013/0265169 A1* | 10/2013 | Mates .................... 340/686.1 |
| 2014/0194078 A1* | 7/2014 | Hikino .................... 455/90.2 |

FOREIGN PATENT DOCUMENTS

| | | |
|---|---|---|
| JP | 55-8142 A | 1/1980 |
| JP | 62-193220 U | 12/1987 |
| JP | 4-211524 A | 8/1992 |
| JP | 2007-174612 A | 7/2007 |

OTHER PUBLICATIONS

English version of International Search Report dated Mar. 19, 2012.

* cited by examiner

*Primary Examiner* — Tan Ho
(74) *Attorney, Agent, or Firm* — Birch, Stewart, Kolasch & Birch, LLP

(57) ABSTRACT

An eyeglasses-type wireless communications device includes: left and right eyepiece sections; pads; endpieces; temples; and an antenna element for carrying out wireless communications, and the antenna element is disposed in a region along an outer edge(s) of the right eyepiece section and/or the left eyepiece section, the region including corresponding one(s) of the endpieces but excluding connecting parts of the eyepiece sections which parts are connected to the respectively corresponding pads.

17 Claims, 9 Drawing Sheets

EYEGLASSES-TYPE WIRELESS COMMUNICATIONS APPARATUS

TECHNICAL FIELD

The present invention relates to an eyeglasses-type wireless communications device.

BACKGROUND ART

In recent years, there have been developed electronic devices of eyeglasses appearances, such as (i) a pair of three-dimensional eyeglasses for watching a three-dimensional television, and (ii) a pair of three-dimensional eyeglasses and an eyeglasses-type head-mounted display both for enjoying three-dimensional games. These electronic devices may include an antenna to carry out wireless communications.

Conventionally known as an eyeglasses-type wireless communications device are, for example, devices as described in Patent Literatures 1 and 2, i.e. a device having an antenna provided in or on a frame of a pair of eyeglasses. More specifically, Patent Literature 1 describes a technique of disposing an antenna in the vicinity of a substantially middle section of a lens frame. Further, Patent Literature 2 describes incorporation of an antenna into a temple section.

CITATION LIST

Patent Literature 1

Japanese Patent Application Publication, Tokukai, No. 2007-174612 A (Publication Date: Jul. 5, 2007)

Patent Literature 2

Japanese Unexamined Utility Model (Registration) Application Publication, Jitsukaisho, No. 62-193220 A (Publication Date: Dec. 8, 1987)

SUMMARY OF INVENTION

Technical Problem

However, the eyeglasses-type wireless communications devices according to the conventional techniques can suffer from degradation of antenna characteristics.

FIGS. 9 and 10 are diagrams showing examples of a general radiation direction (beam direction) of a beam from an antenna of the eyeglasses-type wireless communications devices according to the conventional techniques.

The eyeglasses-type wireless communications device as described in Patent Literature 1 has an antenna with an antenna element 90 positioned near a nose of a user, as shown in (a) of FIG. 9. In this case, the antenna element 90 is positioned in front of a face of the user. Therefore, as shown in (b) of FIG. 9, a range of a direction of beams that can be transmitted and received by the antenna element 90 is affected by a head of the user and thus becomes an area, centered around the antenna element 90, extending in a front direction with respect to the user's face (area equivalent to about half of an area extending in all directions).

Further, the eyeglasses-type wireless communications device as described in Patent Literature 2 has an antenna with an antenna element 90 positioned near an ear of a user, as shown in (a) of FIG. 10. In this case, the antenna element 90 is positioned on the side of a face of the user. Therefore, as shown in (b) of FIG. 10, a range of a direction of beams that can be transmitted and received by the antenna element 90 is affected by a head of the user and thus becomes an area, centered around the antenna element 90, extending in a lateral direction with respect to the user's face (area equivalent to about half of an area extending in all directions).

As described above, according to the conventional techniques, the beam direction of the antenna is the front or lateral direction with respect to the user's face. This results in the problem that transmission/reception characteristics decrease depending on an arrival direction of radio waves. In addition, the antenna, which is positioned near the head, has the problem that an antenna gain decreases.

The present invention has been attained in view of the above problems. A main object of the present invention is to realize an eyeglasses-type wireless communications device having an excellent antenna gain.

Solution to Problem

In order to solve the above problems, an eyeglasses-type wireless communications device according to the present invention is an eyeglasses-type wireless communications device including: left and right eyepiece sections; pads; endpieces; temples; and an antenna element for carrying out wireless communications, the antenna element being disposed in a region along an outer edge(s) of the right eyepiece section and/or the left eyepiece section, the region including corresponding one(s) of the endpieces but excluding connecting parts of the eyepiece sections which parts are connected to the respectively corresponding pads.

The above arrangement reduces shadowing caused by a user's head and increases an open area for the antenna. That is, the above arrangement achieves the effect of easing constraints on a beam direction of the antenna and resolving transmission/reception performance degradation which can occur depending on an arrival direction of radio waves.

That is, the antenna element is disposed in the region along the outer edge(s) of the eyepiece section(s), which region includes the endpiece(s) and excludes connecting parts of the eyepiece sections which parts are connected to the respectively corresponding pads. With this arrangement, the antenna element can be disposed at a position which is not a member(s) positioned closest to a head (e.g. pad(s) and temple(s)) out of the members of the eyeglasses, and such a position is away from the head and can reduce shadowing caused by a user's head. This achieves the effect of improving an antenna gain.

Advantageous Effects of Invention

An eyeglasses-type wireless communications device according to the present invention reduces shadowing caused by a user's head and resolves transmission/reception performance degradation which can occur depending on an arrival direction of radio waves. Further, since the antenna element is positioned at a place away from the head, an antenna gain improves.

DESCRIPTION OF EMBODIMENTS

The following will describe details of embodiments according to the present invention. An eyeglasses-type wireless communications device according to the present invention is not particularly limited as long as it has an eyeglasses appearance and carries out wireless communications, and the eyeglasses-type wireless communications device according to the present invention can be applied to various uses as three-dimensional eyeglasses, a head-mounted display, a headset, a radio receiver, an individual identification device, etc.

Embodiment 1

The following will describe one embodiment (Embodiment 1) of the present invention with reference to FIGS. 1 through 5.

(General Configuration of the Eyeglasses-Type Wireless Communications Device 1)

Figure 2:
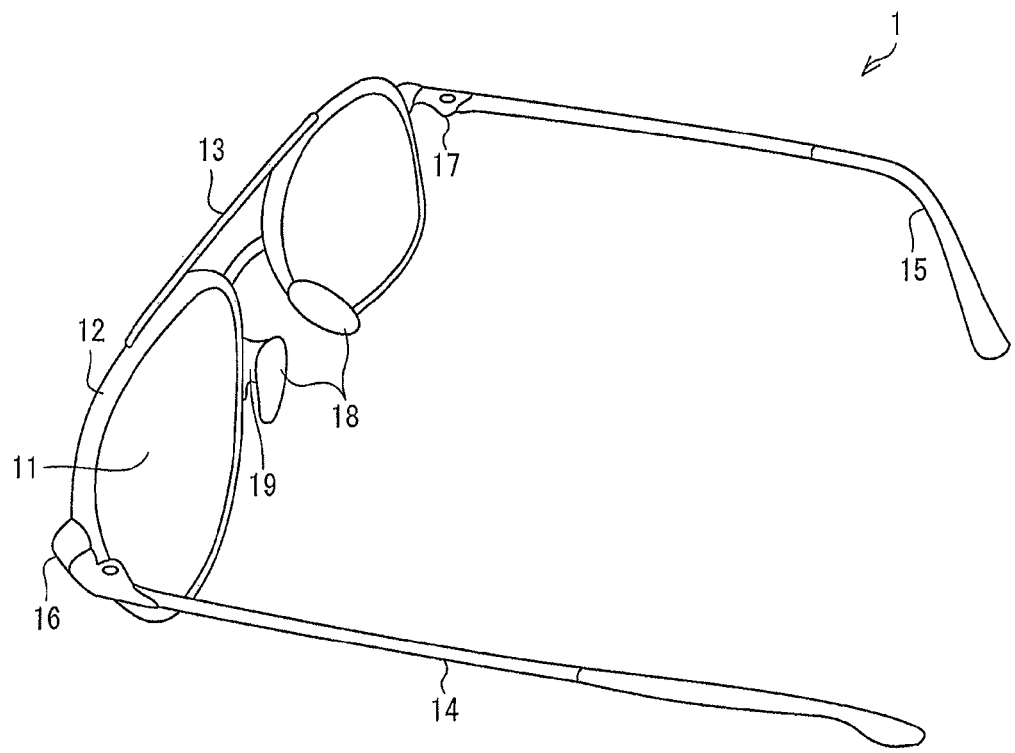
FIG. 2 is a general view of an eyeglasses-type wireless communications device.

FIG. 2 is a general view of an eyeglasses-type wireless communications device 1 according to the present embodiment. As shown in FIG. 2, the eyeglasses-type wireless communications device 1 has an eyeglasses appearance and includes eyepiece sections 11, rims 12, a bridge 13, temples 14, temple tips 15, endpieces 16, hinges 17, pads 18, and pad arms 19.

The eyepiece sections 11 are optical members positioned respectively in front of left and right eyes. The eyepiece sections 11 can be, for example, eyeglasses-type lenses. Alternatively, the eyepiece sections 11 may be each incorporated into a display for displaying images, such as a LCD (Liquid Crystal Display) and a retina operation display.

The rims 12 are retaining members that surround the corresponding eyepiece sections 11 to retain the eyepiece sections 11. The rims 12 do not necessarily protect entire circumferences of the eyepiece sections 11. Alternatively, the rims 12 may each protect only a substantially half of the circumference of the eyepiece section 11 or may each protect only a part of the circumference of the eyepiece section 11. Further, the eyeglasses-type wireless communications device 1 does not necessarily include the rims 12.

The bridge 13 is a connecting member for making connection between the left and right eyepiece sections 11. The bridge 13 connects, via the rim 12 or directly, between the left and right eyepiece sections 11 in such a manner that the eyepiece sections 11 are placed in predetermined positions.

Each of the temples 14 is a member including an ear-hook and is also termed "bow". In addition, the temple 14 may be arranged such that a part of the temple 14 resting on user's ear can be covered with a coating member, which is termed the temple tip 15.

Each of the endpieces 16 is a connecting member for connecting the eyepiece section 11 to the temple 14. The endpiece 16 is provided in a region along an outer edge of the eyepiece section 11. The endpiece 16 may be integrated with the rim 12 or may be independently coupled to the eyepiece section.

Each of the hinges 17 is an open/close member for allowing the temple 14 to be folded with respect to the eyepiece section 11 and other members. The hinge 17 is provided between the endpiece 16 and the temple 14.

Each of the pads 18 is a member that contacts a user's nose.

Each of the pad arms 19 is a connecting member for connecting the pad 18 to the eyepiece section 11. The pad arm 19 connects, via the rim 12 or directly, the pad 18 to the eyepiece section 11 in such a manner that the pads 18 and the eyepiece sections 11 are placed in predetermined positions. In addition, the eyeglasses-type wireless communications device 1 does not necessarily include the pad arms 19. In such a case, the pad 18 can be directly connected to the eyepiece section 11 or the rim 12.

The above-described members may be constructed of the same material(s) as those for typical eyeglasses. However, this is not the only possibility. Examples of a material for the rims 12, the bridge 13, and the temples 14, may include metal (e.g. titanium, titanium alloy, aluminum alloy, magnesium alloy, nickel-chromium alloy, and stainless steel) and plastic (e.g. epoxy resin, celluloid, acetate, and polyamide), without any specific limitation.

(Internal Configuration of the Eyeglasses-Type Wireless Communications Device 1)

Figure 1:
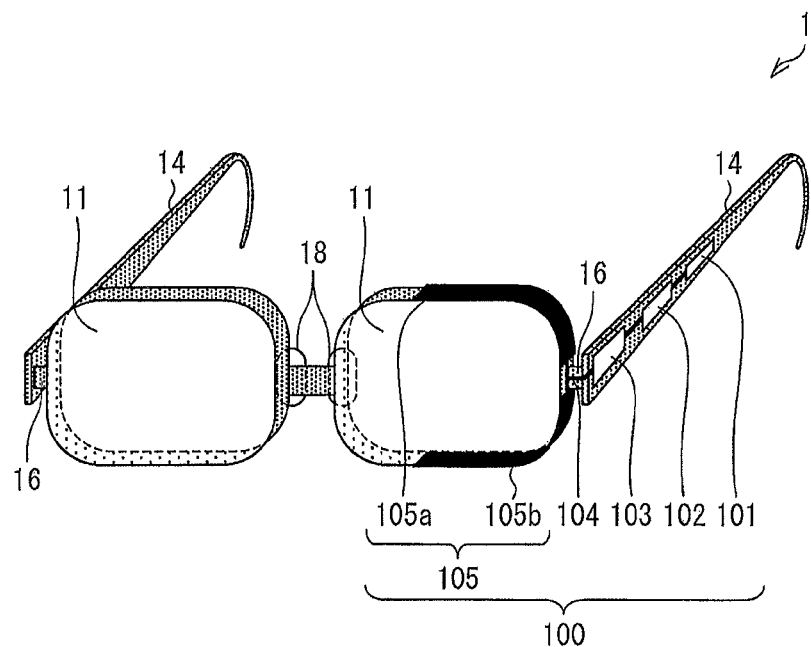
FIG. 1 is a view showing an internal configuration example of an eyeglasses-type wireless communications device according to Embodiment 1.

Next, an internal configuration of the eyeglasses-type wireless communications device 1 will be described with reference to FIG. 1. FIG. 1 is a view showing the internal configuration of the eyeglasses-type wireless communications device 1. Note that FIG. 1 illustrates an eyeglasses-type wireless communications device which does not include the rim 12. However, the present embodiment is not limited to this configuration. Alternatively, an eyeglasses-type wireless communications device according to the present embodiment may be configured to include the rim 12. Note that, if the rim 12 is provided in the present embodiment, the rim 12 is preferably constructed of an insulating material such as plastic. This makes it possible to further improve antenna characteristics.

As shown in FIG. 1, the eyeglasses-type wireless communications device 1 has an antenna 100. The antenna 100 is a dipole antenna including: a power supply section 101 which supplies power to the antenna 100; a control section 102 which controls an electrical signal; a wireless section 103 which carries out data transmission and reception through an antenna element 105; a power feeding line 104 which feeds, to the antenna element 105, power supplied from the power supply section 101; and the antenna element 105.

As shown in FIG. 1, the power supply section 101, the control section 102, and the wireless section 103 are disposed on the temple 14. The power feeding line 104 extends along the temple 14 so as to be connected to the antenna element 105 via the endpiece 16.

The antenna element 105 is disposed along an outer edge of the eyepiece section 11, with the endpiece 16 positioned at a center of the antenna element 105. The antenna element 105 is constituted by: an antenna element (first antenna element) 105a, which extends from the endpiece 16 toward an upper plumb side of the eyepiece section 11; and an antenna element (second antenna element) 105b, which extends from the endpiece 16 toward a vertically lower side of the eyepiece section 11. That is, the antenna elements 105a and 105b are disposed in such a manner that the endpiece 16 is sandwiched between the antenna elements 105a and 105b in a pair. Note that the outer edge of the eyepiece section 11 refers to an outer edge of a plane facing a user's eye.

Figure 11:
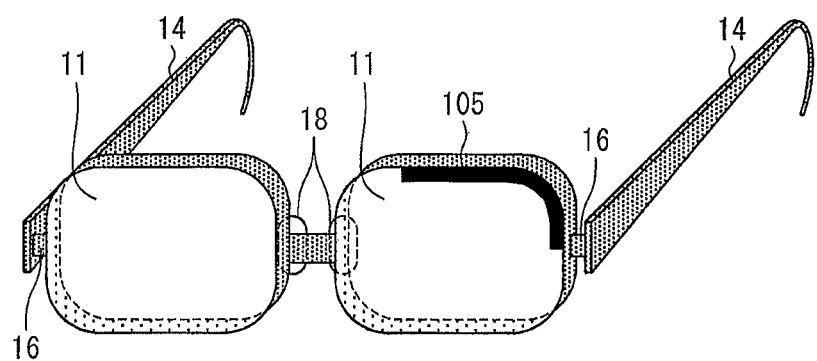
FIG. 11 is a view showing a placement of an antenna element in one modified example.

Note that according to the present embodiment, the antenna element 105 is disposed on a side end plane of the eyepiece section 11, as shown in FIG. 1, but the present invention is not limited to this configuration. For example, as shown in FIG. 11, the antenna element 105 may be provided on a plane (lens plane) of the eyepiece section 11, which plane faces a user's eye. Further, in a case where the outer edge of the eyepiece section is covered with a rim, the antenna element 105 may be provided between the eyepiece section 11 and the rim 12 or may be provided on an inside or outside of the rim 12. Thus, in the present invention, the antenna element 105 needs only to be disposed along the outer edge of the eyepiece section 11, and what member and what surface to which the antenna element 105 is to be placed are not particularly limited. However, at least part of the antenna element 105 may be provided between the eyepiece section 11 and the rim 12 or may be provided in the rim 12. Such an arrangement eliminates the antenna element 105 to be exposed externally, thus achieving improvement in appearance and durability of the eyeglasses-type wireless communications device 1. In addition, it is possible to suitably prevent loss of the eyeglasses appearance, such as protrusion of the antenna element 105.

Further, in Embodiment 1, the antenna elements 105a and 105b each has a shape of a rounded letter L, as shown in FIG. 1. However, in another embodiment, the antenna element 105a and antenna element 105b may differ from each other in at least one of shape and length. Such an arrangement of the antenna elements enables these two antennas to have mutually different resonance frequencies. This allows the eyeglasses-type wireless communications device 1 to be provided for a plurality of frequency bands.

In FIG. 1, the antenna element 105 is disposed along the outer edge of the left eyepiece section 11 of the eyeglasses-type wireless communications device 1. Alternatively, the antenna element 105 may be disposed along an outer edge of the right eyepiece section 11. Further, the antenna element 105 is not disposed at a connecting part of the eyepiece section 11 which part is connected to the pad 18 that will contact a user's face (connecting part of the eyepiece section 11 which part is connected to the pad arm 19). That is, the antenna element 105 is disposed along an outer edge of at least one of the left and right eyepiece sections 11, but the antenna element 105 is not disposed at the connecting part of the eyepiece section 11 which part is connected to the pad 18.

In this manner, the antenna elements 105a and 105b are each disposed on the eyepiece section 11 in a region along the outer edge of the eyepiece section 11, which region includes the endpiece 16 and excludes the connecting part of the eyepiece section 11 which part is connected to the pad 18, and the antenna elements 105a and 105b extend along the outer edge of the eyepiece section 11 in mutually different directions from the endpiece 16. The region where the antenna elements 105a and 105b are to be disposed is arranged to be a region along the outer edge of the eyepiece section 11, which region includes the endpiece 16 and excludes a connecting part of the eyepiece section 11 which part is connected to the pad 18. This arrangement allows the antenna elements 105a and 105b to be disposed at places which are away from a user's head and would reduce shadowing caused by the user's head, as will be described later.

Here, more than half part of the antenna element 105 (antenna elements 105a and 105b) is disposed on an endpiece 16 side of the eyeglasses-type wireless communications device 1. More specifically, more than half of volume of the antenna element 105 is disposed at a position closer to the endpiece 16 where the power feeding line 104 is provided than to the pad 18. The eyeglasses-type wireless communications device 1 shown in FIG. 1 is arranged such that approximately four-fifth of the antenna element 105 is disposed on the endpiece 16 side.

(Effect of the Eyeglasses-Type Wireless Communications Device 1)

Figure 3:
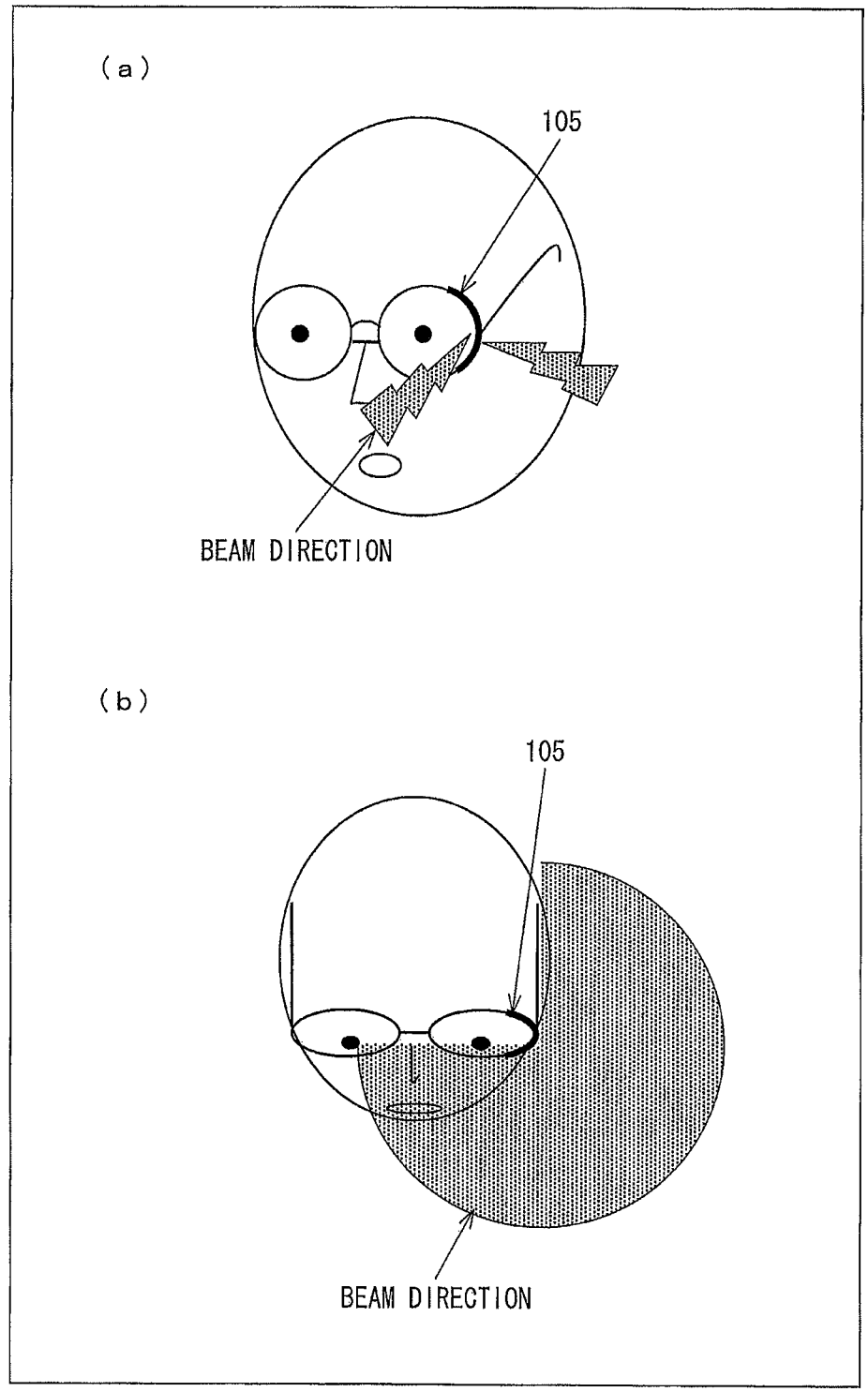
FIG. 3 is a view showing a beam direction example of an antenna of the eyeglasses-type wireless communications device shown in FIG. 1.

FIG. 3 shows a range of a beam direction obtained by using the eyeglasses-type wireless communications device 1 of FIG. 1.

(a) of FIG. 3 is a view showing an example of the beam direction when a face of a user who uses the eyeglasses-type wireless communications device 1 is viewed from an oblique side, and (b) of FIG. 3 is a view showing a beam direction of the antenna element 105 when the user is viewed from directly above.

Figure 9:
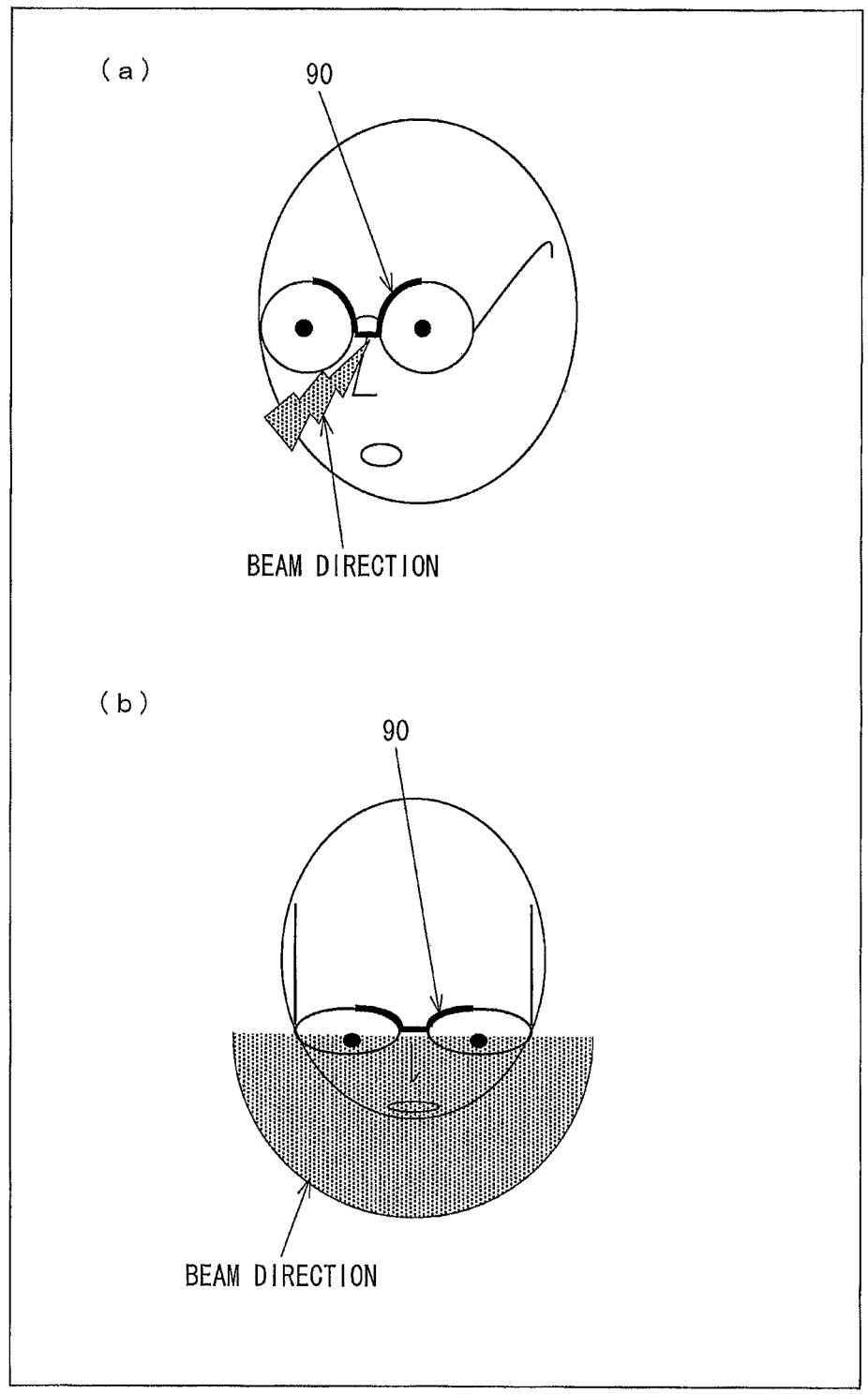
FIG. 9 (a) of FIG. 9 shows an example of an eyeglasses-type wireless communications device having an antenna element disposed in front, and (b) of FIG. 9 shows a beam direction example of the antenna element shown in (a) of FIG. 9.
Figure 10:
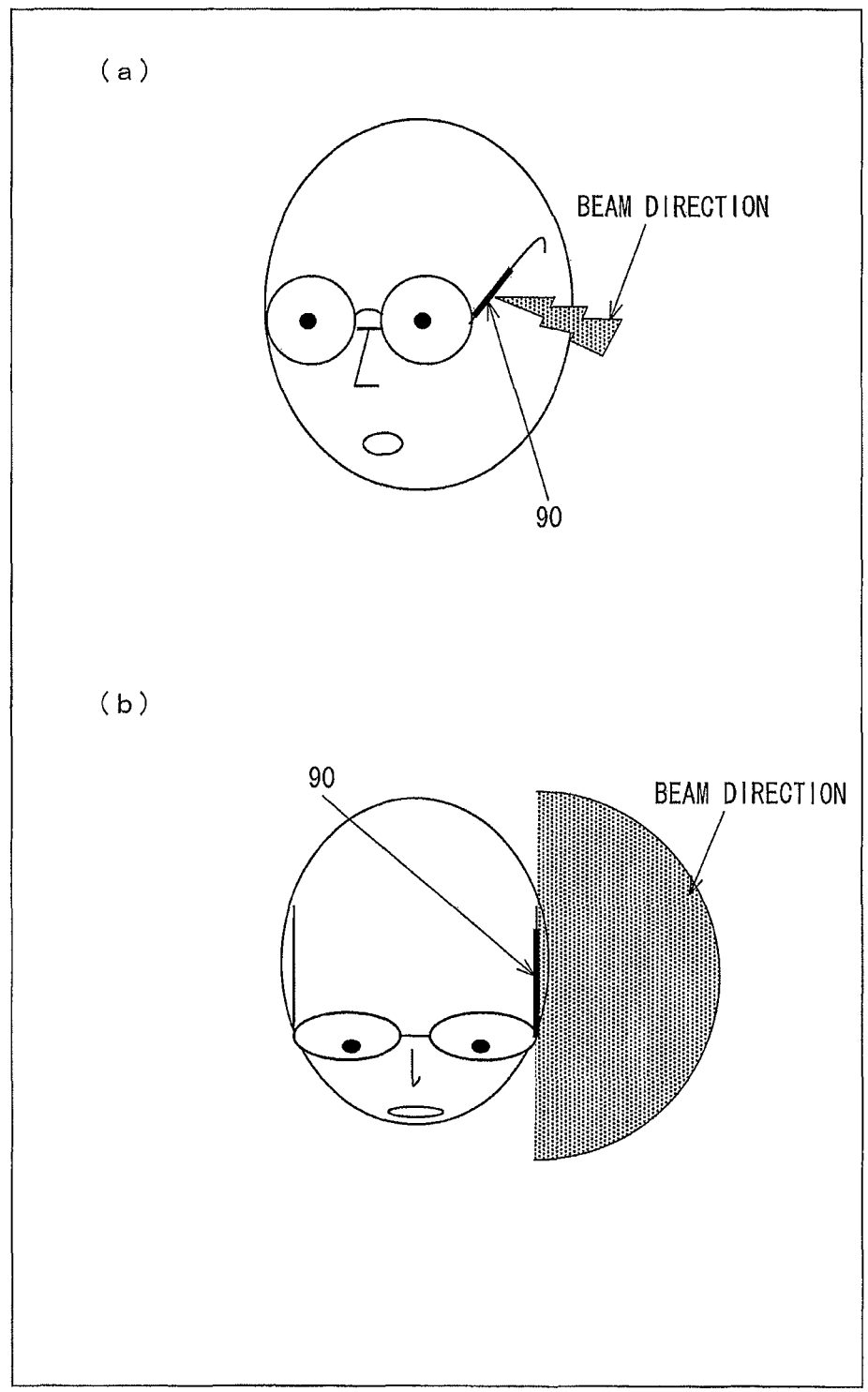
FIG. 10 (a) of FIG. 10 shows an example of an eyeglasses-type wireless communications device having an antenna element disposed on the side, and (b) of FIG. 10 shows a beam direction example of the antenna element shown in (a) of FIG. 10.

As shown in (a) of FIG. 3, the eyeglasses-type wireless communications device 1 is arranged such that the antenna element 105 is disposed in a region which includes the endpiece 16 and excludes the connecting part of the eyepiece section 11 which part is connected to the pad 18. That is, the antenna element 105 is disposed at an extension part of the eyeglasses-type wireless communications device 1 when the user's head is viewed from above. In such a situation, a beam direction of the antenna element 105 roughly extends to directions, centered around the antenna element 105, toward a front and a side of the user's face, as shown in (b) of FIG. 3. Thus, the eyeglasses-type wireless communications device 1 according to the present embodiment reduces shadowing caused by a user's head and increase an open area for the antenna, as compared to the conventional eyeglasses-type wireless communications devices as shown in FIGS. 9 and 10. This allows for easing of constraints on the beam direction of the antenna and resolves transmission/reception performance degradation which can occur depending on an arrival direction of radio waves.

Figure 5:
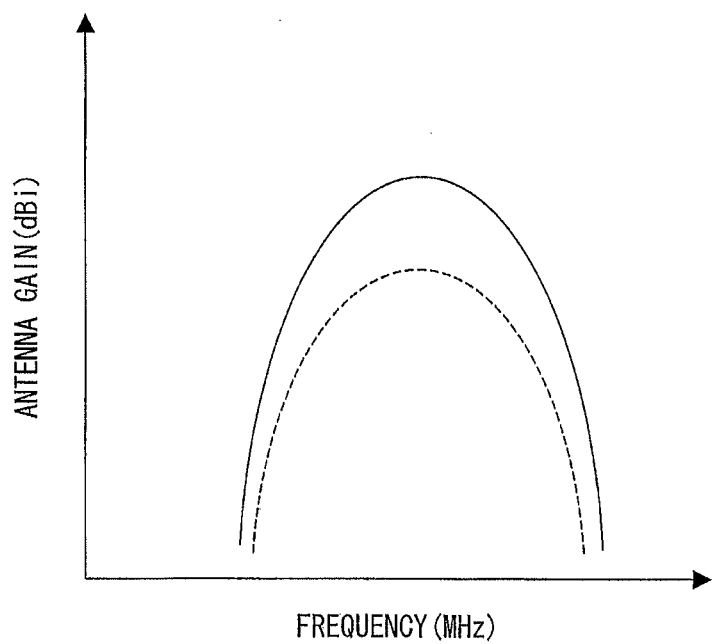
FIG. 5 is a graph showing an antenna gain with respect to a frequency of the eyeglasses-type wireless communications device shown in FIG. 1.

Next, an antenna gain of the antenna 100 of the eyeglasses-type wireless communications device 1 shown in FIG. 1 will be described with reference to FIG. 5. FIG. 5 is a graph showing an antenna gain with respect to a frequency. In FIG. 5, a solid line indicates an antenna gain of the antenna 100, and a dotted line indicates an antenna gain of the antenna 90 disposed as shown in FIG. 9. Further, in FIG. 5, a lateral axis indicates a frequency (MHz), and a longitudinal axis indicates an antenna gain (dBi).

As shown in FIG. 5, the antenna gain of the antenna 100 is higher than that of the antenna 90. This occurs for the following reason. That is, with such an arrangement that the antenna element 105 is disposed in a region which includes the endpiece(s) 16 and excludes connecting parts of the eyepiece sections which parts are connected to the respectively corresponding pads 18, the antenna element 105 is positioned at a place away from a head. This reduces an adverse effect caused by the user's head as a ground (GND), thus improving an antenna gain. Particularly, the antenna element 105 is not provided on the pad 18, the temple 14, or any other place which comes into direct contact with the user. This makes it possible to suitably improve an antenna gain.

In addition, the antenna 100 (antenna elements 105a and 105b) constitutes a dipole antenna. With such an arrangement that the antenna 100s functions as a dipole antenna, it is possible to reduce an adverse effect of a shape of a ground (GND) (shape of the eyeglasses-type wireless communications device 1). Moreover, functioning of the antenna 100s as a dipole antenna facilitates control of a beam direction of the antenna 100 and thus enables narrowing down to a range of a beam to the front direction with respect to a user's face. This makes it possible to further improve antenna characteristics of the antenna 100.

In addition, the antenna element 105a and the antenna element 105b may constitute a diversity antenna. Such an arrangement that the antenna element 105a and the antenna element 105b constitute a diversity antenna such as a MIMO enables further improvement of transmission/reception characteristics.

MODIFIED EXAMPLES

The above description has discussed the configuration such that the antenna element 105 is made up of two antenna elements (antenna elements 105a and 105b). However, the present invention is not limited to this configuration. For example, although being used as a monopole antenna, the antenna element 105 may be any one of (i) an antenna element (antenna element 105a) provided above the endpiece 16 and (ii) an antenna element (antenna element 105b) provided below the endpiece 16. Also in this case, as described previously, since the antenna element 105 is disposed at such a position that shadowing caused by a user's head can be reduced, it is possible to obtain excellent antenna characteristics.

Besides, the eyeglasses-type wireless communications device 1 may include an additional antenna element.

Note that a length of the antenna element 105 (antenna elements 105a and 105b) is not limited to the length shown in FIG. 1. As long as the antenna element 105 is disposed on the eyepiece section 11 in a region along the outer edge of the eyepiece section 11, which region excludes the connecting part of the eyepiece section 11 which part is connected to the pad 18, any length can be selected as appropriate in accordance with a frequency band to be used in wireless communications.

Figure 4:
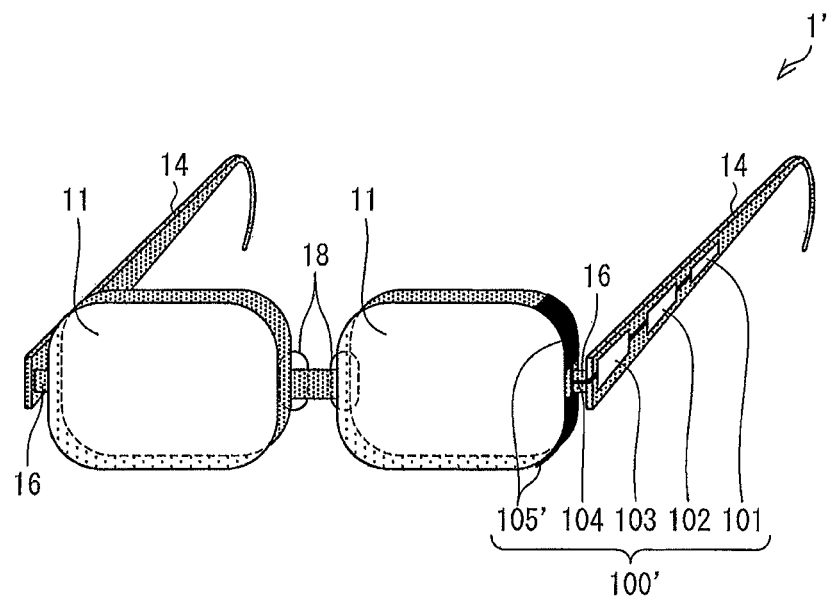
FIG. 4 is a view showing another internal configuration example of the eyeglasses-type wireless communications device.

FIG. 4 is a view showing a general configuration of an eyeglasses-type wireless communications device 1' which uses a higher frequency band than a frequency band used by the eyeglasses-type wireless communications device 1. As shown in FIG. 4, an antenna 100' includes an antenna element 105' having a length shorter than that of the antenna element 105 shown in FIG. 1. Such an antenna element 105' is entirely disposed on the endpiece 16 side (the entirety of the antenna elements 105a and 105b is disposed at a position closer to the endpiece 16 than to the pad 18).

As in the case of the eyeglasses-type wireless communications device 1, the eyeglasses-type wireless communications device 1' has a beam direction range as shown in FIG. 3 and resolves transmission/reception performance degradation which can occur depending on an arrival direction of radio waves. Further, since the antenna element 105' is positioned away from a user's head, an antenna gain is improved.

Embodiment 2

Figure 6:
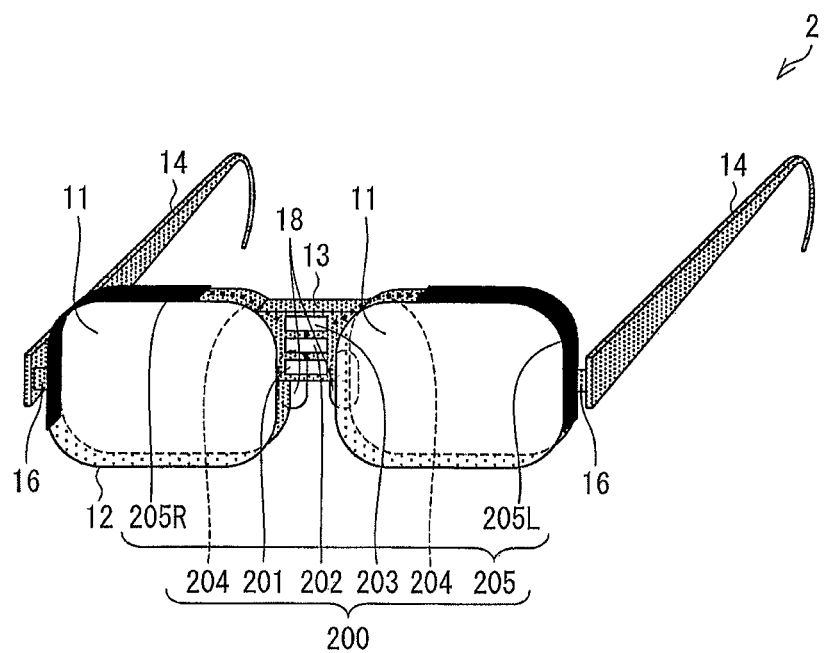
FIG. 6 is a view showing an internal configuration example of an eyeglasses-type wireless communications device according to Embodiment 2.
Figure 7:
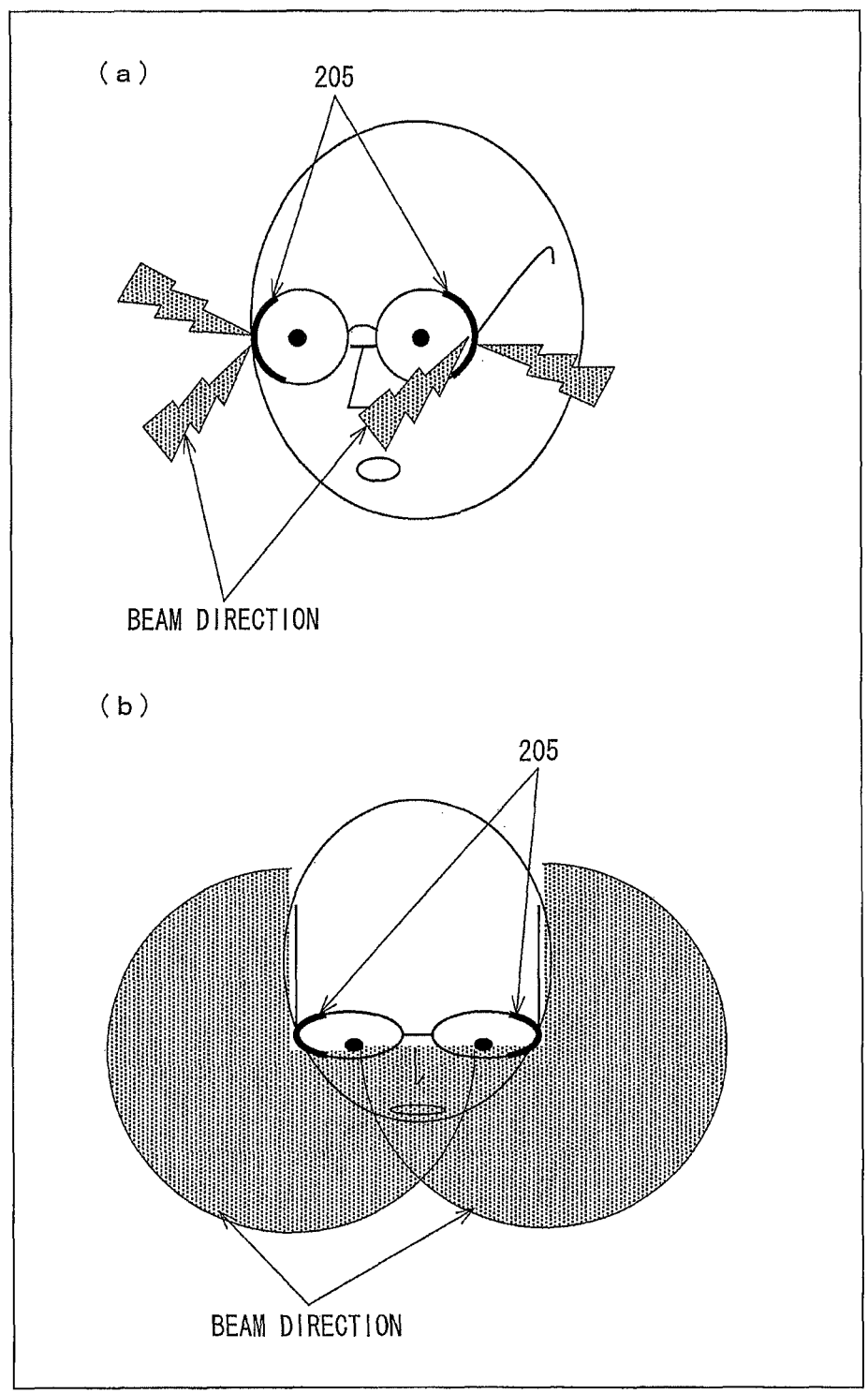
FIG. 7 is a view showing a beam direction example of an antenna of the eyeglasses-type wireless communications device shown in FIG. 6.
Figure 8:
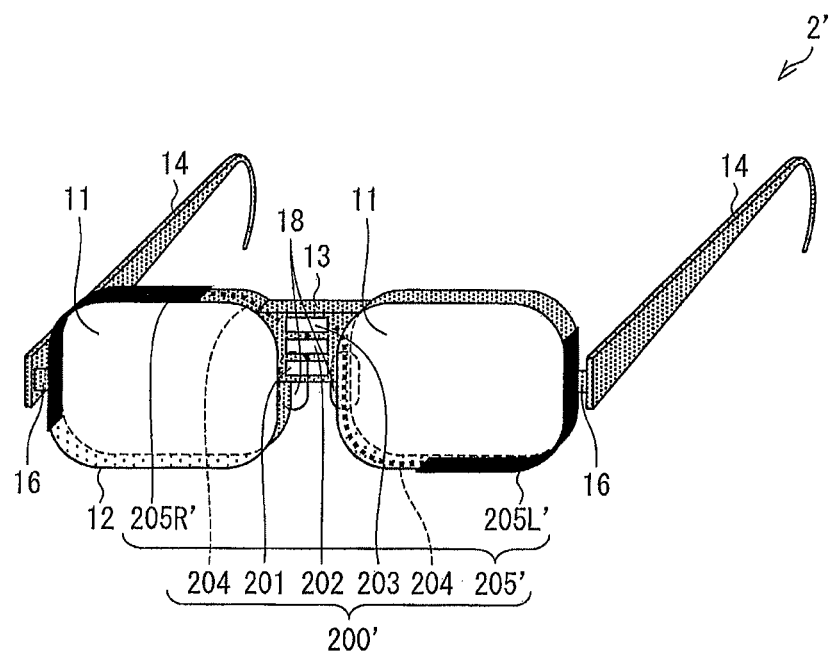
FIG. 8 is a view showing another internal configuration example of the eyeglasses-type wireless communications device according to Embodiment 2.

The following will describe another embodiment (Embodiment 2) of the present invention with reference to FIGS. 6 through 8.

Embodiment 1 has described the eyeglasses-type wireless communications device 1 having the antenna 100 that includes the antenna element 105 which is disposed on the upper and lower portions of the eyepiece section 11 with the endpiece 16 positioned at a center of the antenna element 105. However, the present invention is not limited to the eyeglasses-type wireless communications device 1. For example, the eyeglasses-type wireless communications device 1 may have an antenna including an antenna element which is disposed on the upper portion and/or the lower portion of the eyepiece section 11, with the bridge 13 positioned at a center of the antenna element.

In the present embodiment, the following will describe an eyeglasses-type wireless communications device 2 including an antenna element 205 which is disposed on upper portions of respective left and right eyepiece sections 11 and/or lower portions of the respective left and right eyepiece sections 11 with a bridge 13 positioned at a center of the antenna element 205. Note that in the present embodiment, members including the eyepiece sections 11, rims 12, the bridge 13, temples 14, temple tips 15, the endpieces 16, hinges 17, pads 18, and pad arms 19 have the same configurations as those described in Embodiment 1.

(Internal Configuration of the Eyeglasses-Type Wireless Communications Device 2)

The following will describe an internal configuration of the eyeglasses-type wireless communications device 2 with reference to FIG. 6. FIG. 6 is a view showing the internal configuration of the eyeglasses-type wireless communications device 2. Note that although FIG. 6 illustrates such an arrangement that the eyeglasses-type wireless communications device 2 includes the rim 12, the eyeglasses-type wireless communications device 2 according to the present embodiment may be arranged so as not to include the rim 12. Further, in the present embodiment, the rim 12 can be composed of a metal.

As shown in FIG. 6, the eyeglasses-type wireless communications device 2 includes an antenna 200. The antenna 200 includes a power supply section 201, a control section 202, a wireless section 203, a power feeding line 204, and an antenna element 205. Note that the individual sections of the antenna 200 perform processing in the same manner as those of the antenna 100. Further, the antenna 200 is constituted by two monopole antennas which regard metallic sections, such as the rims 12 and the bridge 13, as a grounding element (GND).

As shown in FIG. 6, the power supply section 201, the control section 202, and the wireless section 203 are disposed between the eyepiece sections 11 (at the bridge 13). The power feeding line 204 extends from the bridge 13 positioned between the left and right eyepiece sections 11, so that the power feeding line 204 is connected to the antenna element 205 via the rims 12.

The antenna element 205 is disposed on upper plumb sides of the left and right eyepiece sections 11, with the bridge 13 positioned at the center of the antenna element 205. The antenna element 105 is constituted by (i) an antenna element (third antenna element) 205L, which is disposed along an outer edge of the left eyepiece section 11; and (ii) an antenna element (fourth antenna element) 205R, which is disposed along an outer edge of the right eyepiece section 11.

As shown in FIG. 6, the antenna element 205L is disposed on an upper portion of the left eyepiece section 11, while the antenna element 205R is disposed on an upper portion of the right eyepiece section 11. That is, the antenna element 205 is disposed along the outer edges of the left and right eyepiece sections 11 on the vertically upper sides of the left and right eyepiece sections 11, with the bridge 13 positioned at the center of the antenna element 205.

Further, the antenna element 205 is disposed in a region which includes the endpieces 16 and excludes connecting parts of the eyepiece sections 11 which parts are connected to the respectively corresponding pads 18. Particularly, it is preferable that more than half of volume of the antenna element 205 is disposed at a position closer to the endpiece 16 than to the pad 18. As shown in FIG. 6, the antenna element 205 (antenna elements 205L and 205R) is provided in a region which includes the endpieces 16, and approximately four-fifth of the antenna element 205 is disposed on the endpieces 16 sides.

Specifically, the phrase "more than half part of the antenna element 205 is disposed on the endpiece 16 side" means that more than half of volume of the antenna element 205L is disposed at a position closer, than to the pad 18, to the endpiece 16 provided at a lateral part of the left eyepiece section 11 on which the antenna element 205L is disposed, while more than half of volume of the antenna element 205R is disposed at a position closer, than to the pad 18, to the endpiece 16 provided at a lateral part of the right eyepiece section 11 on which the antenna element 205R is disposed.

(Effect of Eyeglasses-Type Wireless Communications Device 2)

FIG. 7 shows a general range of a beam direction obtained by using the eyeglasses-type wireless communications device 2 of FIG. 6.

(a) of FIG. 7 is a view showing an example of the beam direction when a face of a user who uses the eyeglasses-type wireless communications device 2 is viewed from an oblique side, and (b) of FIG. 7 is a view showing a beam direction of the antenna element 205 when the user is viewed from directly above.

As shown in (a) of FIG. 7, the eyeglasses-type wireless communications device 2 is arranged such that the antenna element 205 is disposed, on both sides of the eyeglasses-type wireless communications device 2, in a region which includes the endpieces 16 and excludes connecting parts of the eyepiece sections 11 which parts are connected to the respectively corresponding pads 18. That is, the antenna element 205 is disposed on both sides of extension parts of the eyeglasses-type wireless communications device 2 when a head of the user is viewed from above. In such a situation, a beam direction of the antenna element 205 extends to almost all directions centered around the left and right antenna elements in the surroundings of the user's face, as shown in (b) of FIG. 7.

Thus, the eyeglasses-type wireless communications device 2 according to the present embodiment reduces shadowing caused by a user's head and increases an open area for the antenna, as compared to the conventional eyeglasses-type wireless communications devices as shown in FIGS. 9 and 10 and the eyeglasses-type wireless communications device 1 according to Embodiment 1. This allows for further easing of constraints on the beam direction of the antenna and suitably resolves transmission/reception performance degradation which can occur depending on an arrival direction of radio waves. This makes it possible to enhance an intensity of radio waves transmitted and received by the antenna element 205.

Further, as with the eyeglasses-type wireless communications device 1 according to Embodiment 1, the eyeglasses-type wireless communications device 2 is arranged such that the antenna element 205 is disposed in the region which includes the endpiece 16 and excludes the connecting parts of the eyepiece sections 11 which parts are connected to the respectively corresponding pads 18. With such an arrangement, the antenna element 205 is positioned at a place away from the user's head. This reduces an adverse effect caused by the user's head as a ground (GND), thus improving an antenna gain. Particularly, the antenna element 205 is not provided on the pad 18, the temple 14, or any other place which comes into direct contact with the user. This makes it possible to suitably improve an antenna gain.

Note that the antenna element 205R and the antenna element 205L may constitute a diversity antenna. Such an arrangement that the antenna element 205R and the antenna element 205L constitute a diversity antenna such as a MIMO enables further improvement of transmission and reception characteristics.

MODIFIED EXAMPLES

In FIG. 6, the antenna element 205R and the antenna element 205L are depicted as if they have the same shape. However, the present invention is not limited to a specific arrangement. Alternatively, the antenna element 205R and the antenna element 205L may differ from each other in at least one of shape and length. Such an arrangement enables these two antennas to have mutually different resonance frequencies. This allows the eyeglasses-type wireless communications device 2 to be provided for a plurality of frequency bands.

In addition, the above description has discussed the arrangement such that the antenna element 205 is constituted by two antenna elements (antenna elements 205R and 205L). However, the present invention is not limited to such a specific arrangement. For example, the antenna element 205 may be one of the antenna element (antenna elements 205R and 205R') provided on the right eyepiece section and the antenna element (antenna elements 205L and 205L') provided on the left eyepiece section. Such an arrangement, however, decreases an open area for the antenna.

Besides, the eyeglasses-type wireless communications device 2 may include an additional antenna element. For example, the antenna 100 according to Embodiment 1 and the antenna 200 according to Embodiment 2 may be combined. That is, the eyeglasses-type wireless communications device 2 according to Embodiment 2 may further include the antenna element 105 and the wireless section 103.

The eyeglasses-type wireless communications device 2 shown in FIG. 6 is arranged such that the pair of the antenna elements 205 is disposed along the outer edges of the left and right eyepiece sections 11 on the upper plumb sides of the left and right eyepiece sections 11. Alternatively, the antenna element 205 may be disposed along the outer edges of the left and right eyepiece sections 11 on the lower plumb sides of the left and right eyepiece sections 11. Further alternatively, asymmetrical arrangement may be adopted such that one of the pair of the antenna elements 205 is disposed along the outer edge of one of the left and right eyepiece sections 11 on the upper plumb side of the one of the left and right eyepiece sections 11, while the other of the pair of the antenna elements 205 is disposed along the outer edge of the other of the left and right eyepiece sections 11 on the lower plumb side of the other of the left and right eyepiece sections 11.

FIG. 8 shows an eyeglasses-type wireless communications device 2' (antenna 200' and antenna element 205') arranged such that an antenna element 205R' is disposed along an outer edge of a corresponding eyepiece section 11 on an upper plumb side of the eyepiece section 11, while an antenna element 205L' is disposed along an outer edge of a corresponding eyepiece section 11 on a lower plumb side of the eyepiece sections 11. As shown in FIG. 8, the antenna element 205R' is disposed along the outer edge of a right eyepiece section 11 on the upper plumb side of the right eyepiece section 11, while the antenna element 205L' is disposed along the outer edge of a left eyepiece section 11 on the upper plumb side of the left eyepiece section 11.

As in the case of the eyeglasses-type wireless communications device 2, the eyeglasses-type wireless communications device 2' has a beam direction range as shown in FIG. 7 and resolves transmission/reception performance degradation which can occur depending on an arrival direction of radio waves. Further, since the antenna element 205' is positioned away from a user's head, an antenna gain is improved.

As described previously, note that according to the Embodiments 1 and 2, at least part of the antenna element 105 (205) may be provided between the eyepiece section(s) 11 and the rim(s) 12 or may be provided on an inside or outside of the rim(s) 12. Thus, in the present invention, the antenna elements 105 and 205 each needs only to be disposed along the outer edge(s) of the eyepiece section(s) 11, and what member and what surface to which the antenna element 105 (205) is to be placed are not particularly limited. However, at least part of the antenna element 105 (205) may be provided between the eyepiece section(s) 11 and the rim(s) 12 or may be provided in the rim 12. Such an arrangement eliminates the antenna elements 105 and 205 to be exposed externally, thus achieving improvement in appearance and durability of the eyeglasses-type wireless communications devices 1 and 2. In addition, it is possible to suitably prevent loss of the eyeglasses appearance, such as protrusions of the antenna element 105 (205).

Preferable Embodiments of the Present Invention

As described above, an eyeglasses-type wireless communications device according to the present invention is an eyeglasses-type wireless communications device including: left and right eyepiece sections; pads; endpieces; temples; and an antenna element for carrying out wireless communications, the antenna element being disposed in a region along an outer edge(s) of the right eyepiece section and/or the left eyepiece section, the region including corresponding one(s) of the endpieces but excluding connecting parts of the eyepiece sections which parts are connected to the respectively corresponding pads.

The above arrangement reduces shadowing caused by a user's head and increases an open area for the antenna. That is, the above arrangement achieves the effect of easing constraints on a beam direction of the antenna and resolving transmission/reception performance degradation which can occur depending on an arrival direction of radio waves.

That is, the antenna element is disposed in the region along the outer edge(s) of the eyepiece section(s), which region includes the endpiece(s) and excludes connecting parts of the eyepiece sections which parts are connected to the respectively corresponding pads. With this arrangement, the antenna element can be disposed at a position which is not a member(s) positioned closest to a head (e.g. pad(s) and temple(s)) out of the members of the eyeglasses, and such a position is away from the head and can reduce shadowing caused by a user's head. This achieves the effect of improving an antenna gain.

Further, the eyeglasses-type wireless communications device according to the present invention is preferably such that more than half part of the antenna element is disposed at a position closer to a corresponding one of the endpieces than to a corresponding one of the pads.

According to the above arrangement, more than half of volume of the antenna element is positioned on the endpiece side that could reduce shadowing caused by a user's head. This makes it possible to suitably improve an antenna gain.

Still further, the eyeglasses-type wireless communications device according to the present invention may be such that the antenna element includes a first antenna element extending along the outer edge of the right eyepiece section or the left eyepiece section in one direction from a corresponding one of the endpieces, and a power feeding line for supplying power to the first antenna element extends from a wireless section, which is provided on a corresponding one of the temples, so that the power feeding line is connected to the first antenna element via said corresponding one of the endpieces.

According to the above arrangement, even in a case where the wireless section is mounted on the temple, the antenna element can be provided at such a place that shadowing caused by a user's head can be reduced. This makes it possible to suitably obtain (i) the effect of resolving transmission/reception performance degradation which can occur depending on an arrival direction of radio waves and (ii) the effect of improving an antenna gain.

Yet further, the eyeglasses-type wireless communications device may be such that the antenna element includes a second antenna element extending along the outer edge of the right eyepiece section or the left eyepiece section from a corresponding one of the endpieces in another direction opposite to the direction in which the first antenna element extends, and a power feeding line for supplying power to the second antenna element extends from the wireless section so as to be connected to the second antenna element via said corresponding one of the endpieces.

According to the above arrangement, even in a case where the wireless section is mounted on the temple, the antenna element can be provided at such a place that shadowing caused by a user's head can be reduced. This makes it possible to suitably obtain (i) the effect of resolving transmission/reception performance degradation which can occur depending on an arrival direction of radio waves and (ii) the effect of improving an antenna gain. In addition, the above arrangement makes it possible to easily constitute a dipole antenna, thus enabling reduction of an adverse effect caused by a shape of a ground (shape of the eyeglasses-type wireless communications device), and facilitating control of a beam direction. That is, in the above arrangement, it is preferable that the first and second antenna elements constitute a dipole antenna.

Further, the first and second antenna elements may differ from each other in at least one of shape and length. According to the above arrangement, these two antennas have mutually different resonance frequencies. This allows the eyeglasses-type wireless communications device to be provided for a plurality of frequency bands.

Still further, the first and second antenna elements may constitute a diversity antenna. Such an arrangement that the first antenna and the second antenna constitute a diversity antenna such as a MIMO enables further improvement of transmission/reception characteristics.

Yet further, the eyeglasses-type wireless communications device according to the present invention may be such that the antenna element includes a third antenna element being disposed along an outer edge of one of the left and right eyepiece sections, and a power feeding line for supplying power to the third antenna element extends from a wireless section, which is provided between the left and right eyepiece sections, so that the power feeding line is connected to the third antenna element.

According to the above arrangement, even in a case where the wireless section is mounted between the left and right eyepiece sections (for example, on the bridge), the antenna element can be provided at such a place that shadowing caused by a user's head can be reduced. This makes it possible to suitably obtain (i) the effect of resolving transmission/reception performance degradation which can occur depending on an arrival direction of radio waves and (ii) the effect of improving an antenna gain.

Further, the eyeglasses-type wireless communications device may be such that the antenna element includes a fourth antenna element being disposed along an outer edge of the other of the left and right eyepiece sections, and a power feeding line for supplying power to the fourth antenna element extends from the wireless section so as to be connected to the fourth antenna element.

According to the above arrangement, even in a case where the wireless section is mounted between the left and right eyepiece sections (for example, on the bridge), the antenna element can be provided at such a place that shadowing caused by a user's head can be reduced. This makes it possible to suitably obtain (i) the effect of resolving transmission/reception performance degradation which can occur depending on an arrival direction of radio waves and (ii) the effect of improving an antenna gain. In particular, according to the above arrangement, the antenna element is disposed on both sides of the user's head. This allows for further increase of an open area and further reduction of the shadowing effect caused by the head. This makes it possible to effectively resolve transmission/reception performance degradation which can occur depending on an arrival direction of radio waves. In the above arrangement, it is preferable that the third and fourth antenna elements each constitute a monopole antenna.

Still further, the third and fourth antenna elements may differ from each other in at least one of shape and length. According to the above arrangement, these two antennas have mutually different resonance frequencies. This allows the eyeglasses-type wireless communications device to be provided for a plurality of frequency bands.

Yet further, the third and fourth antenna elements may constitute a diversity antenna. Such an arrangement that the third antenna and the fourth antenna constitute a diversity antenna such as a MIMO enables further improvement of transmission/reception characteristics.

Further, the eyeglasses-type wireless communications device according to the present invention may be arranged so as to further include: rims surrounding the right and left eyepiece sections, wherein at least part of the antenna element is disposed between (i) the right eyepiece section and/or the left eyepiece section and (ii) corresponding one(s) of the rims. Further, at least part of the antenna element may be provided in corresponding one(s) of the rims.

According to the above arrangement, it is possible to suitably dispose the antenna element in the eyeglasses-type wireless communications device. That is, the above arrangement eliminates the antenna element to be exposed externally, thus achieving improvement in appearance and durability of the eyeglasses-type wireless communications device. In addition, it is possible to suitably prevent loss of the eyeglasses appearance, such as protrusion of the antenna element.

The present invention is not limited to the aforementioned embodiments and is susceptible of various changes within the scope of the accompanying claims. Also, an embodiment obtained by suitable combinations of technical means which are disclosed in the different embodiments are also included within the technical scope of the present invention.

INDUSTRIAL APPLICABILITY

The present invention can be applied to the fields of manufacturing three-dimensional eyeglasses, eyeglasses for games, a head-mounted display, a headset, a radio receiver, an individual identification device, etc.

REFERENCE SIGNS LIST 1, 1' Eyeglasses-type wireless communications device
11 Eyepiece section
12 Rim
13 Bridge
14 Temple
15 Temple tip
16 Endpiece
17 Hinge
18 Pad
19 Pad arm
100, 100' Antenna
101 Power supply section
102 Control section
103 Wireless section
104 Power feeding line
105, 105' Antenna element
(105a First antenna element)
(105b Second antenna element)
2, 2' Eyeglasses-type wireless communications device
200, 200' Antenna
201 Power supply section
202 Control section
203 Wireless section
204 Power feeding line
205, 205' Antenna element
(205R, 205R' Third antenna element)
(205L, 205L' Fourth antenna element)

The invention claimed is:

1. An eyeglasses-type wireless communications device comprising:
   an eyepiece section
   pads;
   endpieces; and
   an antenna element for carrying out wireless communications,
   the antenna element being disposed in a region along an outer edge of the eyepiece section, the region including corresponding one(s) of the endpieces but excluding connecting parts of the eyepiece section which parts are connected to the respectively corresponding pads.

2. The eyeglasses-type wireless communications device according to claim 1, wherein
   more than half part of the antenna element is disposed at a position closer to a corresponding one of the endpieces than to a corresponding one of the pads.

3. The eyeglasses-type wireless communications device according to claim 1, further comprising:
   temples, wherein
the antenna element includes a first antenna element extending along the outer edge of the eyepiece section in one direction from a corresponding one of the endpieces, and
a power feeding line for supplying power to the first antenna element extends from a wireless section, which is provided on a corresponding one of the temples, so that the power feeding line is connected to the first antenna element via said corresponding one of the endpieces.

4. The eyeglasses-type wireless communications device according to claim 3, wherein
the antenna element includes a second antenna element extending along the outer edge of the eyepiece section from a corresponding one of the endpieces in another direction opposite to the direction in which the first antenna element extends, and
a power feeding line for supplying power to the second antenna element extends from the wireless section so as to be connected to the second antenna element via said corresponding one of the endpieces.

5. The eyeglasses-type wireless communications device according to claim 4, wherein
the first and second antenna elements constitute a dipole antenna.

6. The eyeglasses-type wireless communications device according to claim 4, wherein
the first and second antenna elements differ from each other in at least one of shape and length.

7. The eyeglasses-type wireless communications device according to claim 4, wherein
the first and second antenna elements constitute a diversity antenna.

8. The eyeglasses-type wireless communications device according to claim 1, wherein
the eyepiece section comprises left and right eyepiece sections,
the antenna element includes a third antenna element being disposed along an outer edge of one of the left and right eyepiece sections, and
a power feeding line for supplying power to the third antenna element extends from a wireless section, which is provided between the left and right eyepiece sections, so that the power feeding line is connected to the third antenna element.

9. The eyeglasses-type wireless communications device according to claim 8, wherein
the antenna element includes a fourth antenna element being disposed along an outer edge of the other of the left and right eyepiece sections, and
a power feeding line for supplying power to the fourth antenna element extends from the wireless section so as to be connected to the fourth antenna element.

10. The eyeglasses-type wireless communications device according to claim 9, wherein
the third and fourth antenna elements each constitute a monopole antenna.

11. The eyeglasses-type wireless communications device according to claim 9, wherein
the third and fourth antenna elements differ from each other in at least one of shape and length.

12. The eyeglasses-type wireless communications device according to claim 9, wherein
the third and fourth antenna elements constitute a diversity antenna.

13. The eyeglasses-type wireless communications device according to claim 1, further comprising:
a rim surrounding the eyepiece section, wherein
at least part of the antenna element is disposed between the eyepiece section and the rim.

14. The eyeglasses-type wireless communications device according to claim 1, further comprising:
a rim surrounding the eyepiece section, wherein
at least part of the antenna element is provided in the rim.

15. The eyeglasses-type wireless communications device according to claim 1, wherein
the antenna element is provided to a part of the eyeglasses-type wireless communications device which part does not come into contact with a user.

16. The eyeglasses-type wireless communications device according to claim 1, further comprising:
temples,
wherein
the pads and/or the temples are not provided with the antenna element.

17. The eyeglasses-type wireless communications device according to claim 1, further comprising:
temples,
wherein
the antenna element comprises: a first antenna element extending along the outer edge of the eyepiece section in one direction from a corresponding one of the endpieces; and a second antenna element extending along the outer edge of the eyepiece section from a corresponding one of the endpieces in another direction opposite to the direction in which the first antenna element extends, and
the first antenna element and the second antenna element are supplied with power from a wireless section, which is provided on the temple, via said corresponding one of the endpieces.

* * * * *